United States Patent [19]

Heller et al.

[11] Patent Number: 5,488,626
[45] Date of Patent: Jan. 30, 1996

[54] METHOD OF AND APPARATUS FOR PUMPING OF TRANSITION METAL ION CONTAINING SOLID STATE LASERS USING DIODE LASER SOURCES

[75] Inventors: Donald F. Heller, Bound Brook; Timothy C. Chin, Lebanon, both of N.J.; Jerzy S. Krasinski, Stillwater, Okla.

[73] Assignee: Light Age, Inc., Warren, N.J.

[21] Appl. No.: 640,653

[22] Filed: Jan. 14, 1991

[51] Int. Cl.⁶ .................................................. H01S 3/091
[52] U.S. Cl. ..................... 372/70; 372/40; 372/41; 372/75
[58] Field of Search ............................ 372/40, 41, 70, 372/75

[56] References Cited

U.S. PATENT DOCUMENTS

| | | | |
|---|---|---|---|
| 4,841,530 | 6/1989 | Choi et al. | 372/41 |
| 4,932,031 | 6/1990 | Alfano et al. | 372/41 |
| 4,949,347 | 8/1990 | Satoh et al. | 372/41 |
| 5,027,169 | 6/1991 | Takahashi et al. | 357/17 |

*Primary Examiner*—Georgia Y. Epps
*Attorney, Agent, or Firm*—Morgan & Finnegan

[57] ABSTRACT

The present invention encompasses an apparatus for pumping a vibronic laser, which comprises: a transition-metal ion-containing solid state vibronic laser gain medium; a means for exciting said laser medium to emit coherent radiation said exciting means being a pumping source comprising at least one laser diode operating at a wavelength shorter than 750 nm; and an optical resonator means for generating and controlling said coherent radiation. The present invention also encompasses a method of pumping a vibronic laser comprising the steps of: generating a laser diode pumping beam at a wavelength shorter than 750 nm; exciting a transition-metal ion-containing solid state vibronic laser gain medium by impinging said laser diode pumping beam on said transition-metal ion-containing solid state laser gain medium, so as to excite the laser medium; and an optical resonator to emit coherent radiation.

16 Claims, 2 Drawing Sheets

METHOD OF AND APPARATUS FOR PUMPING OF TRANSITION METAL ION CONTAINING SOLID STATE LASERS USING DIODE LASER SOURCES

BACKGROUND OF THE INVENTION

This invention relates to methods of and apparatus for the pumping of transition metal ion containing solid state lasers using visible diode laser sources operating in the visible spectrum.

Solid state lasers employ dopant ions incorporated in dilute concentrations in solid hosts as the laser-active gain media. Broadly tunable solid state lasers derive their tunability from emission of vibrational quanta (phonons) concurrent with the emissions of light quanta (photons). The energies of the photons and phonons which are emitted simultaneously in a vibronic laser add up to the energy of the associated purely electronic or "no-phonon" transition. The broad wavelength tunability of such a "vibronic laser" derives from the broad energy phonon continuum which complements the photon emission.

The use of a transition metal ion as a dopant in a solid state laser medium is known in the art. Walling et al (U.S. Pat. No. 4,272,733) discloses the use of alexandrite, a chromium-doped beryllium aluminate ($Cr^{+3}$: $BeAl_2O_4$) crystal, as a laser medium. The disclosure of Walling et al U.S. Pat. No. 4,272,733 is incorporated herein by reference.

Alexandrite has been optically pumped with flashlamps in pulsed operation (See *Tunable Alexandrite Lasers*, IEEE, J. of Quantum Electronics, Vol. QE-16, No. 12, Dec. 1980, pp. 1302) and arc-lamps in continuous wave ("CW") operation. (See *Tunable CW Alexandrite Laser*, IEEE, J. of Quantum Electronics, Vol. QE-16, No. 2, Feb. 1980, pp. 120). Such flashlamps and arc-lamps have broad band emissions ranging from ultraviolet (300 nm) to infared (1000 nm). Alexandrite, however, predominantly absorbs in the visible wavelength region, approximately 400–700 nm. The overlapping of alexandrite's absorption spectrum by the output of such lamps results in good but, not ideal, pumping efficiencies and in substantial heating and consequential thermo optical effects.

The pumping of Neodymium ion ($Nd^{+3}$) solid state lasers by semiconductor laser diodes had been demonstrated in the 1970's (see W. Koechner, "Solid State Laser Engineering", Springer series in Optical Sciences, vol. 1, chapt. 6, Springer-Verlag, NY, 1976). However, it was not thought to be a practical means for excitation because of limitations on the laser diodes. In the mid 1980's the advances in semiconductor diodes lasers improved their power and reliability, and several to many milliwatt diode lasers became routinely available. Initially these higher power diode lasers were Gallium Arsenide GaAs compositions emitting at wavelengths longer than 1 um. Their development was driven by the communications industry interested in 1.3–1.5 um fiber optic communications networks. As the semiconductor growth techniques, primarily molecular beam epitaxy (MBE) and metal organic chemical vapor deposition (MOCVD), matured it became possible to grow and fabricate other III-IV composition laser diodes, notably the ternary compositions of AlGaAs, lasing at wavelengths as short as 700 nm, but with power and lifetime optimized at wavelengths longer than 750 nm. In 1984 and 1985 diode lasers were used to pump Nd:YAG (ytterium aluminum garnet) lasers in laboratory demonstrations of practical devices (see R. Scheps, "Efficient laser diode pumped Nd lasers", Applied Optics, Vol. 28, No. 1, 1 Jan. 1989, pp. 8–9). Pumping wavelengths were near 820 nm where the $Nd^+$ absorption bands were well matched to the highest power output wavelengths of the AlGaAs diodes.

Prior to this invention, it was believed that diode pumping of transition metal ion-containing laser materials in general and tunable vibronic laser materials in particular would be impractical for two reasons: 1) the absorption bands are much broader in the transition metal ion-containing laser materials than in the rare earth ions like $Nd^+$ and the absorption strength is weaker unless pumping is done at short (visible or near visible) wavelengths (typically 700 nm and shorter) and 2) the emission cross section of tunable vibronic laser media is typically substantially lower than $Nd^+$ media because the oscillator strength is by necessity spread out over the tuning range rather than localized to a specific wavelength or few wavelengths. This means that the laser gain is substantially lower for a given excitation level and the laser threshold therefore substantially higher for a given loss.

SUMMARY OF INVENTION

In accordance with the invention, it has been surprisingly found that a solid state laser utilizing a single crystal doped with a transition metal ion can be pumped by an exciting means comprising visible diode lasers. The exciting means comprising a diode laser pump beam has a wavelength falling within the absorption spectrum of the transition metal ion dopant.

The present invention encompasses an apparatus for pumping a vibronic laser, which comprises: a transition-metal ion-containing solid state vibronic laser gain medium; a means for exciting said laser medium to emit coherent radiation said exciting means being a pumping source comprising at least one laser diode operating at a wavelength shorter than 750 nm; and an optical resonator means for generating and controlling said coherent radiation.

The solid state laser medium can be doped with various transition metal ions including $Cr^{+3}$. A preferred solid state laser medium is alexandrite doped with $Cr^{+3}$. Useful laser diodes are visible semiconductor diode lasers based on stochiometric compositions of AlGaInP.

The present invention also encompasses a method of pumping a vibronic laser comprising the steps of: generating a laser diode pumping beam at a wavelength shorter than 750 nm; exciting a transition-metal ion-containing solid state vibronic laser gain medium by impinging said laser diode pumping beam on said transition-metal ion-containing solid state laser gain medium, so as to excite the laser medium; and an optical resonator to emit coherent radiation.

The vibronic laser medium can be alexandrite or emerald laser and the pumping is at a wavelength corresponding to the R line absorption and the lasing is on a vibronic transition. Other vibronic laser media which can be used are $Cr^{+3}$:$LiCaAlF_6$ or $Cr^{+3}$:$LiSrAlF_6$ and with such media the diode laser wavelength is shorter than 680 nm and the pumping is directly into the broad absorption band. In the case where the vibronic laser medium is a Ti:$Al_2O_3$, the diode laser wavelength is shorter than 650 nm.

The laser diode pumped laser of the present invention can be employed in any possible laser applications, such as uses in spectroscopy, photochemistry, communications and in medical procedures. In clinical practice, the present invention can be used in photodynamic therapy. Additionally, use can be made of the present laser diode pumped solid state laser as an injecting source to control the frequency of a larger, more powerful, CW or pulsed tunable solid state laser. The solid laser can be frequency doubled or tripled by non-linear optical processes to provide shorter wavelengths usually in the ultra-violet.

Many conventional tuning means may be used to control the laser of this invention. Examples of suitable tuning means include a prism, optical grating, birefringent filter, multilayer dielectric coated filters or lens having longitudinal chromatic aberration. Particularly suitable is a birefringent filter of the general type described by G. Holtom and O. Teschke, "Design of a Birefringent Filter for High-Power Dye Lasers," IEEE J. Quantum Electron QE-10,577, 1974. This type of filter is sometimes referred to as a type of "Lyot filter". (B. Lyot, Compt. Rend. 197, 1593, 1933).

In operation, the laser of this invention is used to generate tunable coherent radiation. The process for operating the laser comprises activating the laser diode pumping means to excite the solid state laser medium and optionally using a tuning means—for example, rotatable a birefringent plate—to achieve the desired output wavelength. The laser optionally includes cooling means for temperature control; i.e. to maintain a desired temperature. For example, if the cooling means comprise a circulating fluid, the flow rate and temperature of the fluid can be adjusted to maintain the desired temperature. The circulating fluid may be air, water, a cryogenic liquid, etc. A heater may be used to control the fluid temperature when operation at elevated temperatures is desirable.

Optionally, the laser may include means for Q-switching. These means may comprise a saturable dye absorber, an acousto-optic Q-switch or a Pockels cell and polarizing element placed in the beam path. The Q-switch "spoils" the Q of the optical resonator cavity for an interval of time during which energy is stored. At the appropriate moment the Q-switch is turned to the low loss condition, and the stored energy in the medium is suddenly released in a "giant pulse" of very short duration. The laser may also be mode-locked using conventional acousto-optic or electro-optic techniques. The laser output may be frequency doubled or tripled using non-linear optical materials placed inside or outside of the laser resonator.

DETAILED DESCRIPTION OF THE DRAWING AND THE INVENTION

Figure 1:
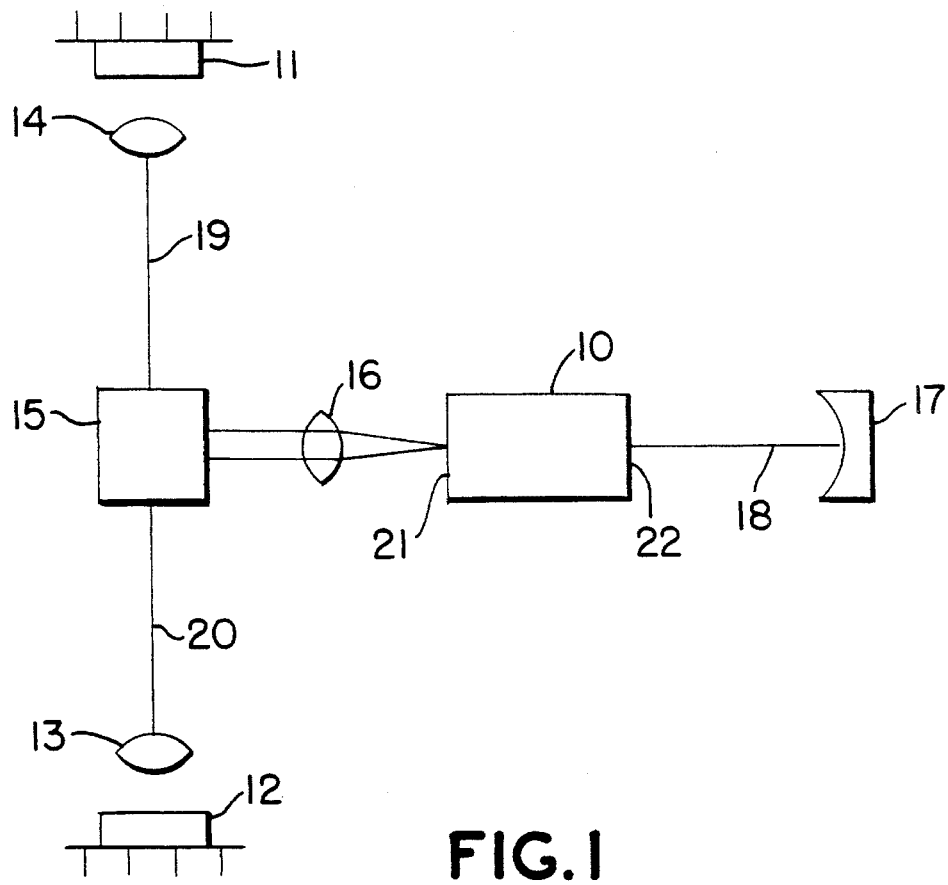
FIG. 1 is a schematic illustration of an apparatus for the pumping of a transition metal ion-containing solid state laser by an exciting means comprising visible diode lasers.
Figure 3:
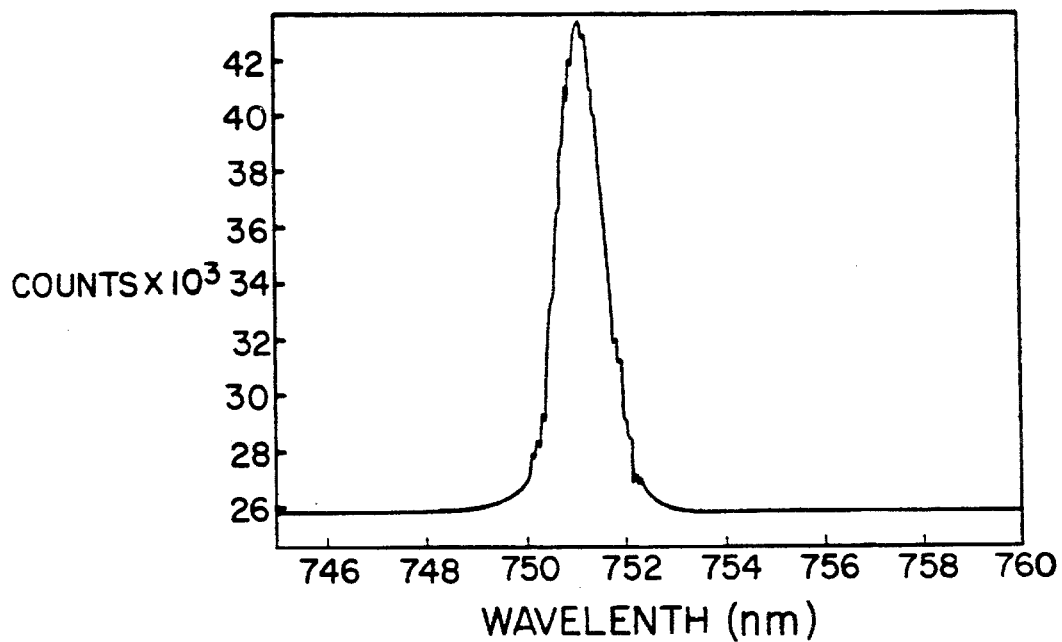
FIG. 3 shows the broad band lasing spectrum of a diode pumped alexandrite laser.

FIG. 1 illustrates a pumping apparatus according to the present invention. Two laser diodes (11, 12) provide pumping emission radiation which is collimated by means (13, 14) to form the collimated pumping emission radiation 19, 20. Pumping emission radiation 19, 20 is combined and aligned by aligning means 15 and focused by focusing means 16 onto the lasing medium 10. The lasing medium 10 can be provided with coated ends 21 and 22 having conventional di-electric coating. Coating 21 is on the exterior face of the lasing medium 10 and is a dichroic coating which transmits at the pumping wavelength and reflects the laser emission (18). Coating 22 is on an interior face of the lasing medium and is an anti-reflection coating. The aligned pumping emission radiation is focused by focusing means 16 onto the lasing medium 10 in order to excite the lasing medium and to cause the emission of coherent laser radiation 18. An output coupler 17 which is partial reflector at the solid state laser wavelength couples optical power out of the resonator cavity.

The collimating (13, 14) aligning (15) and focusing means (16) are well-known means to those skilled in the art. Possible such means include lenses or mirrors or prisms. The free standing output coupler may be eliminated if the anti-reflection coatings on the gain medium is replaced by a partially reflective, partially transmissive coating. Alternatively, both ends of the gain medium can be anti-reflection coated or cut at Brewster's angle and a free standing high reflector and output coupler utilized. This provides for convenient insertion of optical control elements (Q-switches, tuners etc.) into the cavity.

A highly efficient and compact laser device can be achieved through the pumping of a transition metal ion doped solid state laser by one or more laser diodes operating within the absorption spectrum of the transition metal ion. The laser diodes must supply sufficient energy which is at least sufficient to exceed the lasing threshold of the lasing medium. The upper limit of the laser diode output is limited only by the nature of the semiconductor laser device.

Laser-active gain media useful in this invention include transition metal ion doped solid state crystals. The preferred lasing medium is a chromium-doped beryllium aluminate ($Cr^{+3}$:$BeAl_2O_4$) having the chrysoberyl structure ("alexandrite"). Other acceptable $Cr^+$ ion containing media include: emerald ($Cr^{+3}$:$Be_3Al_2(Si\ O_3)_6$); $Cr^{+3}$:$SrAlF_5$; chromium GSGG (Gallium Scandium Godolinium Garnet), or GSAG (Gallium Scandium Aluminum Garnet); chromium—LiCAF and LiSAF ($Cr^{+3}$:$LiCaAlF_6$ and $Cr^{3+}$: $LiSrAlF_6$); LGS ($La_3Ga_5\ SiO_{14}$); $ScBO_3$; and $KZnF_3$. The lasing medium could also be based on other divalent or trivalent transition metal ions primarily doped into oxide or fluoride containing hosts such as $Ti^{+3}$: Sapphire ($Al_2O_3$); $Co^{+2}$: $MgF_2$; $V^{+2}$:$MgF^{+2}$; $Ce^{+3}$: YLF; and $Ni^{2+}$: MgO. Additionally, a $Cr^{+4}$ vibronic laser material can be used.

The R-line spectral features of many $Cr^+$ materials, which are responsible for 3 level lasing therein, provide sufficient absorption for longer wavelength pumping by the relatively low powered laser diodes so as to induce 4 level vibronic laser action. The absorption spectra of alexandrite exhibits sharp $R_1$ and $R_2$ absorption features along the crystallographic b-axis at a wavelength of 680.4 nm. The spectra is also characterized by a broad blue band peak band peaking at 410 nm which consists of transition from the ground state to the $^4T_2$ vibronic state and a broad red band at 590 nm consisting of transitions to the $^4T_2$ state. The vibronic emission can therefore be optically pumped at the wavelength of the R line absorption or at any shorter wavelength. In $Cr^+$ hosts field with low crystal field, R-line absorption is absent and pumping is directly into the $^4T$ state.

Alexandrite (with $Cr^+$ concentrations in the range of 0.1–1 atomic %) can be made to lase by pumping with an exciting means comprising visible laser diodes, such as AlGaAs/GaAs or AlGaInP diode lasers, at a wavelength equivalent to the R line wavelength of 680.4 nm. Lasing will occur at a diode laser output of only 10 mw and may occur at even lower power levels. A semiconductor diode laser includes a single element diode or any array (linear or two dimensional in character) of diode laser elements. The diode laser may be on continuously (cw pumping) or pulsed. The pumped laser may be of any configuration and may be cw, pulsed, Q-switched, mode-locked, or injection locked or seeded.

Pumping geometries useful in the present invention may be have the diode laser pump beam colinear with the axis of lasing in the solid state gain material (e.g., end pumped), transverse to the solid state gain material (side pumped) or at any angle in between. The shape of the gain media may be cylindrical (rod), prismodial (slab, nonplanar ring), or otherwise.

The coherent radiation emitted from the solid state lasing medium as a result of pumping by the semiconductor laser beam is amplified in any of several optical resonator configurations well known in the art. A possible resonator is defined by two mirrors, one having high transmission at the pumping beam wavelength and high reflectance at the laser wavelength. The second mirror is partially transmissive (0.1% or greater) at the solid state laser wavelength.

EXAMPLE

A rod of alexandrite crystal ($Cr^{+3}:BeAl_2O_4$) was placed in a hemispherical cavity and longitudinally pumped by two laser diodes.

The interior face of the lasing medium was anti-reflection coated from 700 to 800 nm and the exterior face had a dichroic coating which was greater than 99.9% reflective from 757 to 773 nm and highly transmissive at 680 nm.

Figure 2:
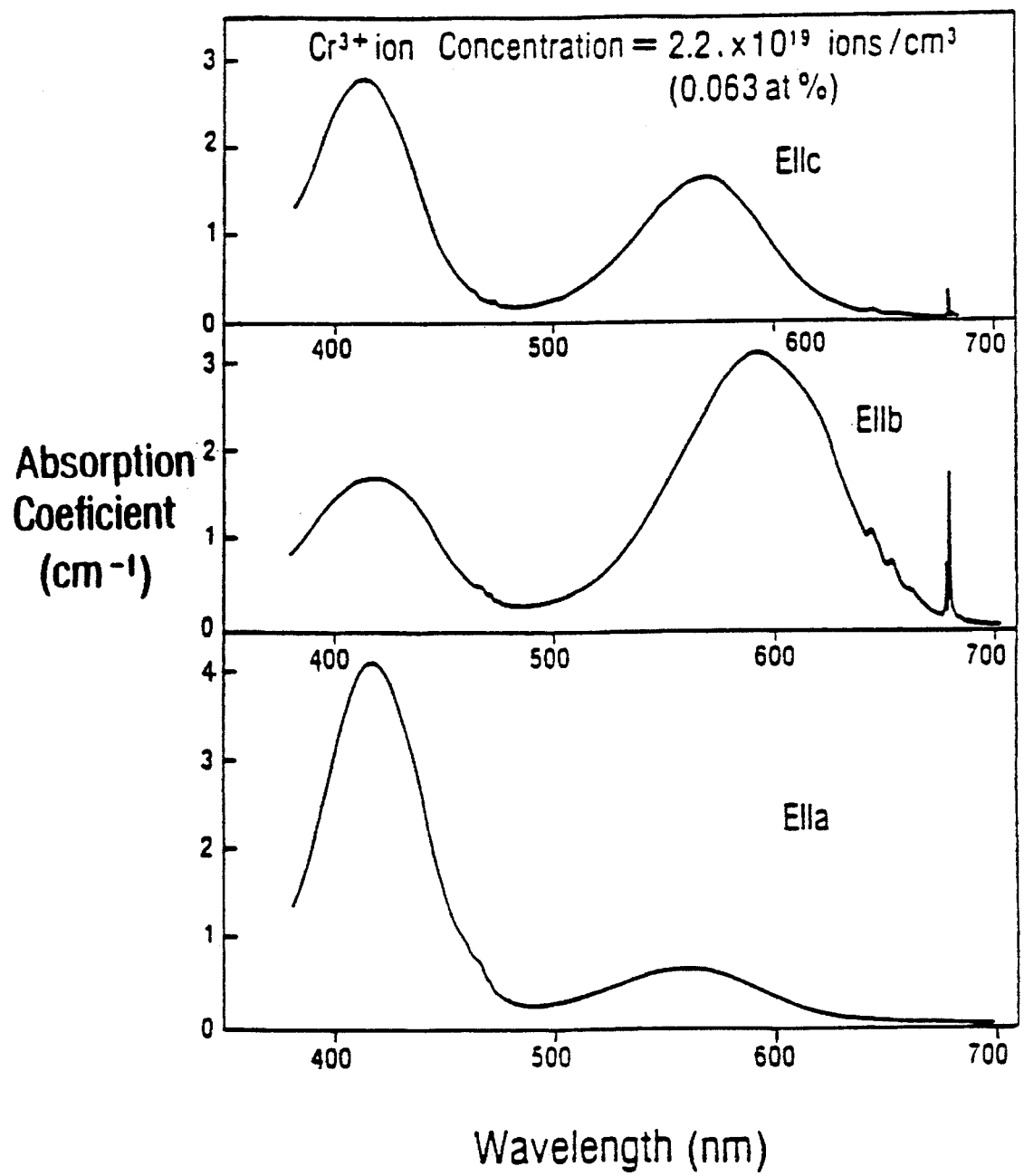
FIG. 2 shows the broad band and R-line absorption spectra of alexandrite.

Two 5 mW Sony AlGaInP laser diodes were used as the exciting means and were operated at 675 and 677 nm at 25° C. It was therefore necessary to temperature tune their output to overlap the $R_1$ line. It was found that the diodes tuned on the average 0.25 nm/° C. and thus both were operated near 40° C. The threshold current for the lasers at this operating temperature was 82 mA and the power slope efficiency was 0.54 mW/mW. The slope efficiency improved as the temperature increased, and was 0.40 and 0.47 mW/mW at 15° and 25° C., respectively. The diodes could be overdriven for short periods of time to produce power in excess of their maximum ratings, a feature that turned out to be necessary to exceed pump threshold. The far-field emission was measured for one of the laser diodes operating at 3mW and showed full width at half maximum (FWHM) divergence angles of 15° and 28° in the planes parallel and perpendicular to the junction, respectively. The spectral width of this laser diode was measured to be 0.75 nm at 680 nm and contained several longitudinal modes. The focused spot size of the laser diode on the alexandrite crystal was circular and measured 29 μm in diameter. Exceeding the maximum rated drive current by several mA for each laser diode, sufficient power was provided to the alexandrite crystal to reach threshold. The broadband lasing spectrum of alexandrite pumped by the laser diodes is shown in FIG. 2.

Although only one embodiment of the present invention has been described in detail, it should be understood that the present invention may be embodied in many other specific forms without departing from the spirit or scope of the invention.

What is claimed:

1. An apparatus for pumping a vibronic laser, which comprises:

a transition-metal ion-containing solid state vibronic laser gain medium;

means for exciting said laser medium to emit radiation said exciting means being a pumping source comprising at least one laser diode operating at a wavelength shorter than 750 nm; and an optical resonator means for generating coherent radiation.

2. The apparatus of claim 1 wherein said solid state vibronic laser gain medium is doped with $Cr^+$ ions.

3. The apparatus of claim 1 wherein said solid state vibronic laser gain medium is alexandrite.

4. The apparatus of claim 1 wherein said solid state vibronic laser gain medium is emerald or $Cr^{+3}:LiSrAlF_6$.

5. The apparatus of claim 1 wherein said laser diodes are visible semiconductor diode lasers based on stochiometric compositions of AlGaInP.

6. The apparatus of claim 1 wherein said vibronic laser gain medium is an alexandrite or emerald laser and the pumping is at a wavelength corresponding to the R line absorption and the lasing is on a vibronic transition.

7. The apparatus of claim 1 wherein the laser gain medium is the vibronic laser media $Cr^{+3}:LiCaAlF_6$ or $Cr^{+3}:LiSrAlF_6$ and the diode laser wavelength is shorter than 680 nm.

8. The apparatus of claim 1 wherein the vibronic laser gain medium is a $Ti:Al_2O_3$ and the diode laser wavelength is shorter than 650 nm.

9. A method of pumping a vibronic laser, comprising the steps of:

generating a laser diode pumping beam at a wavelength shorter than 750 nm;

exciting a transition-metal ion-containing solid state vibronic laser gain medium by impinging said laser diode pumping beam on said transition-metal ion-containing solid state laser medium, so as to excite the laser medium to emit stimulated emission; and recirculating said stimulated emission in an optical resonator.

10. The method of claim 9 wherein said solid state vibronic laser gain medium is doped with $Cr^+$ ions.

11. The method of claim 9 wherein said solid state vibronic laser gain medium is alexandrite.

12. The method of claim 9 wherein said solid state vibronic laser gain medium is emerald or $Cr^{+3}:LiSrAlF_6$.

13. The method of claim 9 wherein said laser diodes are visible semiconductor diode lasers based on a stochiometric compositions of AlGaInP.

14. The method of claim 9 wherein said solid state vibronic laser gain medium is an alexandrite or emerald laser and the laser diode pumping beam is generated at a wavelength corresponding to the R line absorption and the lasing is on a vibronic transition.

15. The method of claim 9 wherein said solid state vibronic laser gain medium is $Cr^{+3}:LiCaAlF_6$ or $Cr^{+3}:LiSrAlF_6$ and the laser diode pumping beam is generated at a wavelength shorter than 680 nm.

16. The method of claim 9 wherein said solid state vibronic laser gain medium is $Ti:Al_2O_3$ and the laser diode pumping beam is generated at a wavelength shorter than 650 nm.

* * * * *

UNITED STATES PATENT AND TRADEMARK OFFICE
CERTIFICATE OF CORRECTION

PATENT NO. : 5,488,626

DATED : January 30, 1996

INVENTOR(S) : Donald F. Heller et al.

It is certified that error appears in the above-identified patent and that said Letters Patent is hereby corrected as shown below:

Column 6,

Line 2 of claims 2 and 20, "$Cr^{\frac{1}{7}}$" should be -- $Cr^{+3}$ --.

Line 2 of claims 4 and 12, after "emerald" delete "or"; after "$Cr^{+3}:LiSrAlF_6$", insert -- $Cr^{+3}:LiCaAlF_6$ --.

Signed and Sealed this

Ninth Day of July, 1996

Attest:

BRUCE LEHMAN

*Attesting Officer*     *Commissioner of Patents and Trademarks*